United States Patent [19]

Porter

[11] 4,314,132
[45] Feb. 2, 1982

[54] ARC WELDING CUPRO NICKEL PARTS

[75] Inventor: Ronald Porter, Wirral, England

[73] Assignee: Grootcon (U.K.) Limited, England

[21] Appl. No.: 42,558

[22] Filed: May 25, 1979

[30] Foreign Application Priority Data

May 30, 1978 [GB] United Kingdom ............ 24337/78

[51] Int. Cl.³ ............................................ B23K 9/225
[52] U.S. Cl. .................... 219/61; 219/137 R;
219/137 WM
[58] Field of Search .................... 219/137 R, 118, 61,
219/137 WM

[56] References Cited

U.S. PATENT DOCUMENTS 2,745,711  5/1956  Westfield .

FOREIGN PATENT DOCUMENTS 488340   4/1949  Belgium .
1229210  2/1962  Fed. Rep. of Germany .
462345   9/1968  Switzerland .
632991   12/1949 United Kingdom .
671115   4/1952  United Kingdom ........... 219/137 R
937063   9/1963  United Kingdom .

OTHER PUBLICATIONS

Vgi Zeitschrift, vol. 118, #8, pp. 13-15, 4/76.
Welding Copper & Nickel Alloys Int. Nickel Pub. #2742b, 1948.
Technical Aspects of Welding Copper & Nickel Alloys, Int. Nickel Pub. #4420, 1976.
The Copper & Nickel Alloys, Int. Nickel Pub. #4353, 1973.
Metals Handbook, 8th Ed., vol. 6, p. 5, 8/71.
Welding & Metal Fabrication, vol. 40, #9, pp. 323-327, 9/72.
Philips Welding Reporter, vol. 8, #1, pp. 14-26, 1972.
Technische Rundschau, vol. 69, #27, pp. 13-15, 7/5/77.

Primary Examiner—Elliot A. Goldberg
Attorney, Agent, or Firm—Lerner, David, Littenberg & Samuel

[57] ABSTRACT

A weld and process for making same and usable in the arc-welding of cupro-nickel (ASME P.34) parts particularly pipe ends using a flux-coated stick electrode, characterized in that an "open V" butt weld is employed with a root face having a mean width greater than 1/16 inch (1.5 mm) and not greater than ⅛ inch (3.2 mm) and a root gap from 2 to 3 mm. The process is further characterized in that the welding is carried out solely from the open side of the V without employing additional inert gas shielding, backing material or subsequent welding at the reverse face.

29 Claims, 2 Drawing Figures

ARC WELDING CUPRO NICKEL PARTS

The invention relates to the welding of cupro-nickel parts and in particular to welding processes using flux-covered stick electrodes without surrounding the welding area with inert gas.

Figure 1:
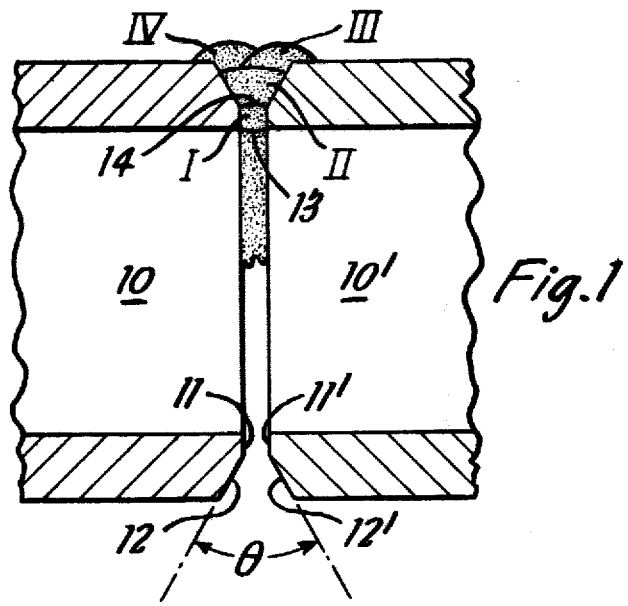

Metal pipe ends are normally welded together by means of an open "V" butt weld. Such a weld is shown in FIG. 1 of the accompanying drawings, which is a longitudinal cross-section through a pair of cylindrical pipes 10, 10'. The end of each pipe is shaped with a frusto-conical surface 12/12' leaving a central annular root face 11,11'. There is thus a V-shaped channel extending around the pipe joint allowing access for the welding material to the whole of each of the end surfaces of the pipes. The angle $\theta$ of the V-groove is generally in the range of 60°–70°. The gap between the root faces 11,11' is typically 2–3 mm in the welding process of the present invention.

Open V butt welding is generally carried out in several stages, as shown in the upper part of FIG. 1. First, a weld I is effected between the root faces. This is the most difficult part of the welding operation especially with pipes where welding in all attitudes is necessary. When the root face weld has been completed, the bottom of the V-shaped groove is sealed off so that it is a relatively simple procedure to add filler welds II, and cap welds e.g. at III and IV.

Until the advent of inert gas shielded welding techniques, it was common to use a stick electrode in arc welding. An improvement in this technique consisted of coating the electrode with a flux which generated an inert gas around the area being welded, to protect the metal parts and molten metal from oxidation. Imperfect shielding normally results in the production of a porous weld which not only makes the joint weak but renders it more liable to corrosion, especially by sea water. In carrying out such a process on sheet materials, a porous weld was normally obtained on the reverse face where there was inadequate shielding. It was therefore necessary to grind out the joint to clean metal at the reverse face and weld it out again from that side, which was no longer open to the atmosphere, so that appropriate gas shielding was present.

This was not of course possible in the welding of parts where the reverse face was inacessible, as in small pipes, and a technique was developed in such cases in which a backing sheet was secured across the gap at the reverse face and welded in place. This of course naturally resulted in an obstruction in the pipe which was a severe disadvantage. It was sometimes possible, where the situation allowed, to protect the reverse face by a bed of non-oxidizing material such as carbon.

The use of backing sheets and the like became generally discontinued with the advent of inert gas shielded welding which is now conventional. In this process a bare wire electrode is normally used which is fed from a gun which also supplies a stream of an inert gas, normally argon, around the welding area. Inert gas welding is generally cumbersome for the welding of pipes and in particular the reverse face is not protected by the inert gas from the gun.

Therefore, for welding pipes, the inside of each pipe section is blocked off a short distance from the joint and the intervening space is filled with the inert gas. The argon arc process requires complicated and expensive apparatus, and is difficult to carry out, particularly when the final section of a pipe line is being welded in position. Once the pipe has been aligned, it may no longer be possible to gain access to the insides of the pipes so that screens of for example rice paper have to be used to contain the argon atmosphere around the weld. These screens are then dissolved during subsequent flushing out of the pipe line. However, should either screen develop a leak, a large length of piping, e.g. between two valves, might have to be filled with argon, or the whole joint split and remade. This is of course a very expensive and time wasting process.

A good account of the techniques and problems of gas shielded arc welding of copper and copper alloys is given in an article "The Gas-Shielded Arc Welding of Copper and Copper Alloys" by P. G. F. du Pré, Philips Welding Reporter 1972, Vol. 8, page 14. The article contains a discussion on the problems of porosity particularly at the reverse face and the need to use a backing sheet or a sealing run on the reverse side. It also discusses the problems of corrosion particularly by sea water and the necessity for pre-heating. Shielded metal arc welding in general is described in volume 6 of the "Metals Handbook" (8th Edition) of the American Society for Metals (ASM) and in an article by D. E. Jordan in "Welding and Metal Fabrication", September 1972 page 323. The latter describes the welding of cupro-nickel metal plates both using a stick electrode as described above (conventionally called shielded manual metal arc welding) and using a particular inert gas shielded technique (Mig process). In each case the test pieces were fillet welded to a steel block to provide the usual backing sheet. The various techniques available for joining copper based alloys are discussed in an article "Joining Copper Based Alloys" by R. J. C. Dawson in "Welding and Metal Fabrication", December 1976, page 703.

Wegrzyn, Vgi Zeitschrift Volume 118 No. 8, April 1976, describes the welding of copper and copper alloys using specially prepared coated electrodes of unalloyed copper. The sheets are welded horizontally in the conventional manner on a bed of graphite and vertical welding is only possible with sheets of up to 5 mm thickness. The butt welding of pipes is not contemplated. The article does discuss the problems associated with the current carrying capacity of the electrode and the distribution of heat in the welding zone which leads to the necessity for pre-heating in the case of sheets of greater than 2 mm thickness.

U.S. Pat. No. 2,745,771 also describes the construction of a special stick electrode for the arc welding of cupro-nickel. The patent suggests that porosity free joints could be obtained but does not suggest that these could be obtained by single side welding without the use of a backing sheet. The welding conditions described involve the use of welding passes on both faces using a double V or X joint.

A very full account of the problems and techniques of welding copper-nickel alloys is to be found in the International Nickel Co. booklet "Welding Copper-Nickel Alloys" (No. 2742B). This gives also further details of the electrodes mentioned hereinafter. This booklet is hereafter called "INCO".

Various publications describe the arc welding of steel parts using stick electrodes and open V butt joints, sometimes referring to the welding of pipes. However, it must be appreciated that the temperature at the weld and notably the conductivity of the electrodes is very different so that no assistance can be obtained from art on the welding of steel. The recommendations as to preparation of the parts to be welded, in the case of cupro-nickel, are extremely diverse. They are illustrated for example in du Pré (above) which gives 12 different figures, none of which correspond to the recommended joints according to the process of this invention.

In summary none of the prior art discloses a process for the single side welding of cupro-nickel without the use of a backing material so as to produce joints which satisfy the rigorous codes enforced in the oil and ship building industries. As will become apparent the joints prepared in accordance with this invention, following the recommendations in the Examples, meet the conditions laid down by ASME IX and indeed they have been found to satisfy the most severe conditions laid down in any of the current testing codes, notably ASME IX, ANSI B 31.3, and the AWS Structural Code.

Although several attempts have been made in the recent past to develop a process whereby pipe ends can be welded together without the use of an argon atmosphere no such process has coped adequately with the most difficult part of the weld, namely the welding of the root faces. Because of difficulties in controlling the temperature around the weld, either the welding material or the pipe ends themselves sag so that instead of obtaining a weld surface which is convex on each side as shown for the root face weld in FIG. 1, these surfaces are concave or show excess penetration.

Several factors influence the ability of the welding material to hold in position, particularly the type of metal used in the metal parts to be welded and in the welding rod itself, the width of the root face, the root gap (i.e. the gap between the opposed root faces between which the weld is made) and the welding temperature.

In conventional welding processes, the root face width is normally not more than 1/16th inch, since it has been generally considered that above that value the desired penetration is not achieved so that the root faces are not wholly covered and the desired weld surface, at least flush with the inside of the pipe and preferably proud relative to it, is not achieved.

In particular INCO recommends for manual metal-arc welding a root face of 1/32 to 1/16 inch (0.8 to 1.5 mm) and a 1/16 inch (1.5 mm) root gap and makes it clear that although improvements in porosity, in particular, have been made by replacing the Monel 137 electrode by the 187 electrode, faults are still to be expected, and the argon-shielded process is recommended at least for inclined pipes. The minimum recommended electrode thickness is 3/32 inch (2.4. mm), and the literature does not disclose flux-coated stick electrodes of smaller thickness, nor are they available on the market.

According to the invention there is provided a weld and process for making same the arc-welding of cupro-nickel (ASME P.34) parts using a flux-coated stick electrode, characterised in that an "open V" butt weld is employed with a root face having a mean width greater than 1/16 inch (1.5 mm) and not greater than 1/8th inch (3.2 mm) and a root gap from 2 to 3 mm. The present invention is advantageous in that the welding can be carried out solely from the open side of the V without employing additional inert gas shielding, backing material or subsequent welding at the reverse face.

Using the particular materials and dimensions of the invention, it has been found that the temperature of the weld area, and the flow of heat away from it, can be controlled so that a satisfactory weld is obtained.

The present invention differs from the known prior art in that a greater width of root face is used. If the width (normally the mean width) is 1/16th of an inch (1.5 mm) or less it is found that the welding material sags and does not hold in position, or that part of the root face itself begins to sag or melt. More preferably the root face width should be over 2 mm, especially if an electrode greater than 2 mm is used. On the other hand, the root face must not be more than 1/8th of an inch (3.2 mm) wide since in that case the desired penetration would not be achieved; in other words, the welding material would not fill the whole of the root gap. The width of the root face is preferably approximately 3/32 inch (2.5 mm), or 2 mm where a 2 mm electrode is used, which is about half as wide again as the widest root faces used in conventional processes. Best results are obtained with a 2 mm electrode, or with an electrode thickness of 1.6 to 2.2 mm.

The parts to be welded are of cupro-nickel alloy (ASME code No. P34). The preferred alloy consists essentially of 85 to 95 wt.% copper and 5 to 15 wt.% nickel. A particularly preferred alloy has approximately 90 wt.% copper and 10 wt.% nickel. Particularly desirable for this purpose is the alloy known as KUNIFER 10 (KUNIFER is a Registered Trade Mark).

The welding rod is also of a cupro-nickel alloy, a particularly suitable one being Monel 187, which has the AWS code A5.6 Class ECuNi, or ASME SFA-5.6 Class ECuNi.

Using the present invention, it has been found that (unless the wall thickness is exceptionally large) it is not normally necessary to pre-heat the welding surface before welding is carried out, and that welding can be carried out at ambient temperatures. In most conventional processes, the welding surfaces are pre-heated in accordance with the thickness of the wall. Temperatures are recommended by du Pré (above) for gas shielded (mig or Tig) welding, with attendant difficulty on maintaining and controlling the temperature.

The root gap is preferably 2–3 mm (mean width), and the angle of the V-groove ($\theta$ in FIG. 1) is preferably 60°–70°.

Welding of the root faces is conducted using a DC supply with the welding rod. A negative electrode (FIG. 1) is only preferred when using an electrode of above 2.2 mm thickness. It is then however desirable to reverse this polarity for the capping welds, using the welding rod as a positive electrode. At least with electrodes less than 2.2 mm no difficulty is found using a positive electrode which is indeed preferred since greater control is possible. Preferably, a current of 50–75 amps is used for the root weld.

Figure 2:
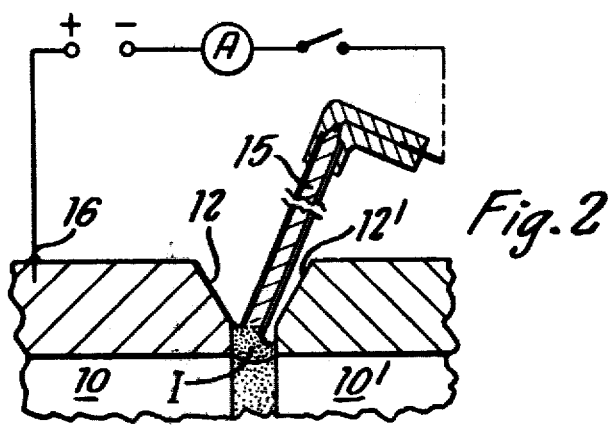

A welding process in accordance with the invention is shown schematically in FIG. 2. During the formation of the root face weld I, the Figure shows a flux-coated stick electrode connected in a conventional circuit to the negative pole of a DC supply, the positive pole being connected to a pipe 10. Reverse connection has been discussed. It can easily be seen how the chamfering of surfaces 12,12' to an angle of 60° gives easy access for the welding rod 15 to the root gap. The positive pole is connected to the electrode in carrying out filling and capping welds II, III and IV.

The following Examples give the results of tests certified by Lloyd's Register of Shipping to be in accordance with ASME IX.

EXAMPLE 1

Two pipe sections of KUNIFER 10 alloy were welded by a shielded manual metal arc process in accordance with FIG. 2, using a 2.5 mm flux-coated welding rod of Monel 187, AWS code ECuNi A5.6, (70:30 CuNi). The electrodes were heated for 2 hrs. at 250° C., according to manufacturing recommendations, before use. The dimensions of the pipe were as follows:

| | |
|---|---|
| Diameter | 8.5 inch |
| Wall thickness (WT) | 6mm |
| Root gap | 2–3mm |
| Root face | 3/32 inch |
| V-groove angle | 70° |

Four passes were made in an uphill direction (position 6G), giving a welding pattern as shown in FIG. 1. For each pass a direct current of 50 to 75 amps was used. In the first pass, in which the root gap was welded, the welding rod was the negative electrode, this polarity being reversed for the 3 subsequent passes. The welding was carried out at ambient temperature without preheating. The diameter of the welding rod used was 2.5 mm.

1. RADIOGRAPHIC EXAMINATION: 100% X Ray; Film Type: AGFA D7; Screens: Lead. 002" front and back Penetrameters: CU 9-15; kV: 200 mAMIN: 4; Sensitivity %: 2; Density: 2.5
2. TENSILE TESTS: Specified Y.S. min: NA; T.S. min: 18 tons per sq. inch.

| Spec no | Dimensions inches | Area sq.in. | Gauge length | Yield load (tons) | Ultimate load (tons) | Uts tsi | Elong | Remarks |
|---|---|---|---|---|---|---|---|---|
| 1 | .75 × .23 | .1725 | 2 in. | 3.00 | 3.96 | 22.95 | 14% | Broke on fusion line |
| 2 | .75 × .23 | 1725 | 2 in. | 2.65 | 3.90 | 22.60 | 25% | Broke on fusion line |

3. BEND TESTS: Specified 180° former distance 4×W.T.

| | Type | Results |
|---|---|---|
| 1. | Root Bend | Satisfactory |
| 2. | " | " |
| 3. | Face Bend | " |
| 4. | " | " |

4. IMPACT TESTS: Not Applicable
5. HARDNESS TESTS: Not Applicable
6. NICK BREAK TESTS: Not Applicable
7. MACRO Test: Satisfactory

EXAMPLES 2, 3, 4

The procedure of Example 1 was followed, the pipe and electrode materials being similar. The conditions are tubulated below:

| | Example | | |
|---|---|---|---|
| | 2 | 3 | 4 |
| Diameter of pipe | 8in. | 10in. | 8in. |
| Wall thickness | 3mm | 4mm | 5mm |
| Root gap | 2–3mm | 2–3mm | 2–3mm |
| Root face | 2mm | 2mm | 2mm |
| V-groove angle | 60° | 60° | 60° |

In each case a specially manufactured Monel 187 flux-coated 2 mm electrode was used for the root wall, connected positively and using a current of 55–65 amps. For the capping welds a standard Monel 187 2.5 mm electrode was used, connected positively at a current which varied from 55 amps to 80 amps.

X-Ray details were as for Example 1 except that Kodak type C film was used and the Penetrameters were D1N 10-16.

| Example | 2 | | | 3 | | 4 | |
|---|---|---|---|---|---|---|---|
| Tensile Tests: | (i) | (ii) | (iii) | (i) | (ii) | (i) | (ii) |
| Dimensions(ins) | 1 × .193 | 1 × .193 | | 1 × .121 | 1 × .121 | 1 × .139 | 1 × .139 |
| Area (sq.in.) | .193 | .193 | 0.2 | 121 | .121 | .139 | .139 |
| N*/mm² | 307 | 307 | 355 | 299 | 299 | 307 | 313 |
| UTS (tsi) | 19.89 | 19.89 | 23.0 | 19.33 | 19.33 | 19.85 | 20.28 |
| Remarks | Pipe break | Pipe break | All weld | Pipe break | Pipe break | Pipe break | Pipe break |

*Neutrons

The results of hardness tests (HV10) and Macro test were all satisfactory as was the X ray examination, root bend and facebend in all Examples. Hardness measurements at various points in the welds varied from a minimum of 92 to a maximum of 166.

While the process of the invention is intended primarily for the welding of pipe ends, it will be appreciated that the process could be used for open V butt welding of other metal parts, for example plates. Annealing of the welded parts should be carried out if the material of the metal parts requires such treatment, as is well known.

The preferred electrodes are as described and claimed in British Patent No. 937063, of which Monel 187 is an Example.

Thus the preferred electrode comprises a core wire containing by weight from 25 to 35% nickel, from 0 to 1% iron, less than 0.15% carbon, from 0 to 1% silicon, from 0 to 3% manganese, and from 0 to 1% titanium, the balance except for impurities being copper, and a flux-forming coating consisting, by weight, of 5 to 70% of manganese carbonate, 0 to 40% of at least one alkaline earth metal carbonate, the total amount of manganese carbonate and alkaline earth metal carbonate in the coating being from 15 to 70%, from 10 to 35% titanium dioxide, from 5 to 40% cryolite, and a binder with or without minor amounts of other constituents.

I claim:

1. A method for welding together a pair of cupronickel parts, comprising the steps of providing a substantially symmetrical open V butt joint between said parts, said joint including first and second divergent faces on the respective parts, a first root face continuing said first divergent face and a second root face continuting said second divergent face, each of said first and second root faces having a mean width greater than 1.5 mm and not greater than 3.2 mm and said first and second root faces being substantially parallel and separated by a root gap of from 2 mm to 3 mm; root-welding said first root face to said second root face using a flux-coated stick electrode of from 1.6 mm to 2.2 mm diameter applied solely from the widemouthed side of said open V butt joint without employing inert gas shielding, backing material or subsequent welding at the opposite side of said open V butt joint; and subsequently cap-welding said divergent faces.

2. A method according to claim 1, wherein said parts are pipes.

3. A method according to claim 1, wherein said parts have a wall thickness not greater than 6 millimeters.

4. A method according to claim 1, wherein said mean width of said first and second root faces is approximately 2 millimeters.

5. A method according to claim 1, wherein said parts are made from an alloy consisting essentially of 85% to 95% copper by weight and 5% to 15% nickel by weight.

6. A method according to claim 1, wherein said parts have a thickness not substantially greater than 10 millimeters.

7. A method according to claim 6, wherein said first and second root faces are welded together at ambient temperature without preheating said parts.

8. A method according to claim 1, wherein the polarity of said electrode is positive.

9. A method according to claim 1, wherein the polarity of said electrode is negative during the welding of said first and second root faces.

10. A method according to claim 1, wherein said first and second faces are welded together to produce a weld which conforms with ASME code Section IX.

11. A method according to claim 1, wherein said first and second root faces are welded together to produce a weld which meets the most severe of any conditions stipulated by ASME code Second IX, ANSI B31.3 and AWS Structural Codes.

12. A method according to claim 8, wherein said first and second divergent faces form an angle therebetween in a range of about from 60° to about 70°.

13. A method according to claim 1, wherein said electrode has an AWS classification of A 5.6 EBCuNi.

14. A method for welding together a pair of cupronickel pipes of wall thickness not less than 6 mm, comprising the steps of providing a substantially symmetrical open V butt joint between first and second respective ends of said pipes, said joint including first and second divergent faces on respective said ends, and parallel first and second root faces continuing respectively said first and second divergent faces, each of said first and second root faces having a mean width greater than 1.5 mm and not greater than 3.2 mm and said first and second root faces being substantially parallel and separated by a root gap of from 2 to 3 mm; root-welding said root faces together using a flux-coated stick electrode of a nominal diameter of 2.5 mm applied solely from the widemouthed side of said open V butt joint without employing inert gas shielding, backing material or subsequent welding at the opposite side of said open V butt joint; and subsequently cap-welding said divergent faces.

15. A method according to claim 14, wherein each of said root faces has a nominal mean width of 2.4 mm.

16. A method according to claim 14, wherein the polarity of said electrode is positive.

17. A method according to claim 14, wherein the polarity of said electrode is negative during the welding of said first and second root faces.

18. A method according to claim 14, wherein said first and second root faces are welded together to produce a weld which conforms with ASME code Section IX.

19. A method according to claim 14, wherein said first and second root faces are welded together to produce a weld which meets the most severe of any conditions stipulated by ASME code Section IX, ANSI B31.3 and AWS Structural Codes.

20. A method according to claim 16, wherein said first and second divergent faces form an angle therebetween in a range of from about 60° to about 70°.

21. A method according to claim 14, wherein said electrode has an AWS classification of A 5.6 EBCuNi.

22. A method according to claim 14, wherein each of said root faces has a mean width greater than 2.0 mm and not greater than 3.2 mm.

23. A method for welding together a pair of cupronickel pipes of wall thickness less than 6 mm, comprising the steps of providing a substantially symmetrical open V butt joint between first and second respective ends of said pipes, said joint including first and second divergent faces on respective said ends and parallel first and second root faces continuing respectively said first and second divergent faces, each of said first and second root faces having a mean width greater than 1.5 mm and not greater than 3.2 mm and said first and second root faces being substantially parallel and separated by a root gap of from 2 to 3 mm; root-welding said root faces together using a flux-coated stick electrode of from 1.6 to 2.2 mm diameter applied solely from the widemouthed side of said open V butt joint without employing inert gas shielding, backing material or subsequent welding at the opposite side of said open V butt joint; and subsequently cap-welding said divergent faces.

24. A method according to claim 23, wherein the polarity of said electrode is positive.

25. A method according to claim 23, wherein the polarity of said electrode is negative during the welding of said first and second root faces.

26. A method according to claim 23, wherein said first and second root faces are welded together to produce a weld which conforms with ASME code Section IX.

27. A method according to claim 23, wherein said first and second root faces are welded together to produce a weld which meets the most severe of any conditions stipulated by ASME code Section IX, ANSI B31.3 and AWS Structural Codes.

28. A method according to claim 24, wherein said first and second divergent faces form an angle therebetween in a range of from about 60° to about 70°.

29. A method according to claim 23, wherein said electrode has an AWS classification of A 5.6 EBCuNi.

* * * * *